United States Patent [19]

Ishikawa

[11] Patent Number: 5,288,270
[45] Date of Patent: Feb. 22, 1994

[54] FLEXIBLE SHAFT HAVING ELEMENT WIRE GROUPS AND LUBRICANT THEREBETWEEN

[75] Inventor: Yoshiaki Ishikawa, Ashiya, Japan

[73] Assignee: Taisei Kohzai Kabushiki Kaisha, Osaka, Japan

[21] Appl. No.: 963,028

[22] Filed: Oct. 19, 1992

Related U.S. Application Data

[63] Continuation of Ser. No. 563,149, Aug. 6, 1990, abandoned.

[30] Foreign Application Priority Data

Dec. 6, 1989 [JP] Japan .................... 1-317037

[51] Int. Cl.$^5$ .............................................. F16C 1/06
[52] U.S. Cl. ............................................ 464/7; 57/217;
 184/14.1; 184/15.1; 427/294; 427/295;
 427/350; 464/58; 464/60
[58] Field of Search ........................... 464/7-9,
 464/52, 57, 58, 60, 173; 57/212, 213, 217, 223;
 184/14.1, 15.1; 427/294, 295, 350; 252/12.2,
 12.4, 13

[56] References Cited

U.S. PATENT DOCUMENTS

| | | | |
|---|---|---|---|
| 1,811,697 | 6/1931 | Reilly | 57/216 X |
| 1,897,542 | 2/1933 | West | 464/7 |
| 2,000,997 | 5/1935 | Sharpe | 464/58 |
| 3,043,120 | 7/1962 | Waldron | 464/8 |
| 3,192,795 | 7/1965 | Pierce | 464/52 X |
| 3,242,691 | 3/1966 | Robinson et al. | 464/57 |
| 3,705,489 | 12/1972 | Smollinger | 57/217 X |
| 3,791,898 | 2/9174 | Remi | 464/58 X |
| 3,979,896 | 9/1976 | Klett et al. | 57/217 |
| 4,112,708 | 9/1978 | Fukuda | 464/52 X |
| 4,629,707 | 12/1986 | Wolfe | 252/12.2 X |
| 4,655,610 | 4/1987 | Al-Jaroudi | 384/13 |

Primary Examiner—Daniel P. Stodola
Assistant Examiner—Eileen Dunn
Attorney, Agent, or Firm—Armstrong, Westerman, Hattori, McLeland & Naughton

[57] ABSTRACT

A flexible shaft has an inner shaft with a steel core wire and element wire groups which are formed by closely adhering a plurality of steel element wires into band shapes wound around the steel core wire by turns in reverse directions relative to each other. The plurality of element wire groups are formed in layers and in concentric sections. Lubricant is impregnated in clearances between the plurality of steel element wires.

3 Claims, 3 Drawing Sheets

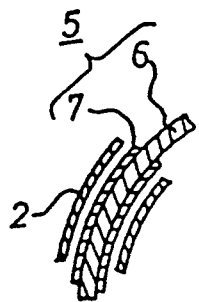
FIG. 3
PRIOR ART
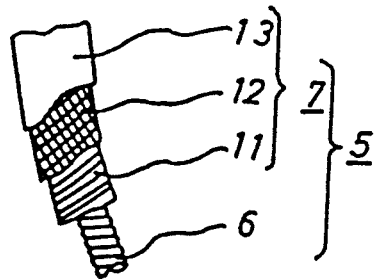
FIG. 4
PRIOR ART
FIG. 5
PRIOR ART
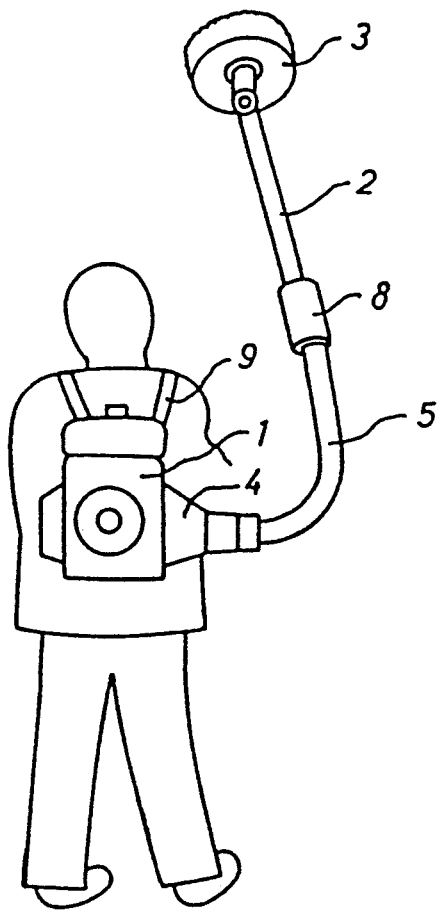

FLEXIBLE SHAFT HAVING ELEMENT WIRE GROUPS AND LUBRICANT THEREBETWEEN

This application is a continuation of application Ser. No. 563,149 filed Aug. 6, 1990, now abandoned.

BACKGROUND OF THE INVENTION

1. Field of the Invention

This invention generally relates to a flexible shaft which transmits a torque under its freely bent condition.

2. Discussion of Relevant Art

A flexible shaft is generally used for various purposes such as a portable mowing machine, industrial machines or the like.

In a general shoulder type mowing machine, an end portion of a pipe 2 is fixed to an engine 1, as illustrated by FIG. 2. A cutter blade 3 is supported to the other end of the pipe 2. Two grips 8 for allowing an operator to hold the mowing machine and a band 9 to be carried on an operator's shoulder are secured onto an outer periphery of the pipe 2. A flexible shaft 5 is inserted in and through the pipe 2, as illustrated in FIG. 3. The flexible shaft 5 is composed of an inner shaft 6 and a liner tube 7 which covers an outer periphery of the inner shaft 6. The inner shaft 6 is connected to an output shaft (not shown) of the engine 1 at one end there of and connected to the cutter blade 3 at another end thereof. Both ends of the liner tube 7 are secured firmly so that they do not rotate together with the inner shaft 6. Accordingly, a torque of the output shaft of the engine 1 is transmitted to the cutter blade 3 through a clutch 4 and the inner shaft 6 of the flexible shaft 5. The liner tube 7 is manufactured in such a manner that an outer periphery of a spiral tube 11, which is formed of closely wound element wires made of steel, is covered by a braid 12; and an outer periphery of the braid 12 is covered by a coating 13 of rubber and vinyl etc.; as illustrated by FIG. 4. The coating 13 may be formed of an extruded liner made of synthetic resin.

In a back type mowing machine, the pipe 2 is installed only between the grip 8 and the cutter blade 3; and the flexible shaft 5 is exposed in a range between the engine 1 and the grip 8, as illustrated in FIG. 5 Consequently, the flexible shaft can be freely bent within the range between the engine 1 and the grip 8.

Generally, the inner shaft 6 is manufactured such that element wire groups, which are formed by closely adhering multiple steel element wires into band shapes, are wound around a steel core wire by turns in reverse directions and a plurality of layers of element wire groups having concentric sections are formed thereon. In assembling the flexible shaft 5, grease of about 10 grams, for example, is filled in the liner tube 7 as lubricant; and the inner shaft 6, an outer periphery of which is applied with grease of about 10 grams, for example, is inserted in the liner tube 7. In carrying out mowing work, the inner shaft 6 rotates in the fixed liner tube 7 at a rotation speed of about 7,000 to 8,000 rpm. However, since another end 2a of the pipe 2 is bent downward so that the cutter blade 3 is positioned in approximately parallel position with the ground surface under a condition where the operator holds the pipe 2, heat generation of the flexible shaft 5 increases in the other end 2a; and consequently, grease deteriorates. For this reason, it has been required for users to take out the inner shaft 6 from the liner tube 7 after every 50 operation hours, for example, to remove old grease, and insert the inner shaft 6 into the liner tube 7 while applying new grease onto the outer periphery of the inner shaft 6. Further, the conventional flexible shaft 5 exhibits a defect in durability because of its wear and tear which is inevitable due to wear of the inner shaft 6; notwithstanding the fact that the grease has been periodically replaced.

More particularly, in the back type mowing machine of FIG. 5, the above-mentioned problem becomes remarkable because the exposed part of the flexible shaft 5 is repeatedly and frequently bent.

SUMMARY OF THE INVENTION

Object of the Invention

The inventor of this invention repeated experiments focusing his attention on a mechanism of heat generation in the flexible shaft, and found that friction between the element wires in the inner shaft and inside friction due to repeated bending of the element wires occupied a major cause of heat generation. In other words as compared with a heating value caused by friction between the inner shaft and the liner tube, a heating value generated in the inner shaft was very large so as to reach approximately 90% of the total heating value. Incidentally, it was ensured that the inner shaft naturally deformed itself in the liner tube into a non-contacting position for producing less friction and this was a cause of minimized friction between the liner tube and inner shaft. As long as the heating value of the inner shaft inside amounts to a major portion of the total heating value, it cannot be expected for the grease to be partially supplied to the inner shaft inside due to centrifugal force, even if a large quantity of grease is applied onto the surface of the inner shaft. Therefore, the above-mentioned disadvantage cannot be avoided.

The present invention is made by focusing on the fact that, as mentioned above, the heat generation of the flexible shaft inside is caused by the friction between the element wires composed of the inner shaft and the inside friction of the element wires. An object of this invention is to provide a flexible shaft which enables effective lubrication and cooling of the inner shaft inside in order to improve its durability, and so as to save manpower for reapplying lubricants (such as, grease, etc.).

Structure of the Invention

In order to accomplish the above-mentioned object, this invention provides a flexible shaft equipped with an inner shaft, in which element wire groups formed by closely adhering a plurality of steel element wires into band shapes are wound around a steel core wire by turns in reverse directions, and the plurality of layers of element wire groups having concentric sections are formed thereon, In this invention, the lubricant is impregnated in clearances between the element wires.

By impregnating the lubricant in clearances between element wires, wear due to friction between the element wires is reduced to a minimum and the heat generation is also controlled when the flexible shaft transmits torque under the bent condition Accordingly, a durability can be improved and manpower for reapplying the lubricant can be saved.

By impregnating the lubricant by means of the vacuum impregnation system, the lubricant can be impregnated successfully in clearances between the element wires.

By impregnating the lubricant at a temperature higher than a normal service temperature of the flexible shaft, much more lubricant can be impregnated into clearances between the element wires and the impregnated lubricant can be preferably controlled from oozing caused by the centrifugal force.

By providing at least one grease-bearing layer between the core wire and element wire group or between the element wire groups, the lubricant impregnated in the grease-bearing layer can be oozed gradually by the centrifugal force so that lubricating and cooling effects can be maintained for a longer period of time.

BRIEF DESCRIPTION OF THE DRAWINGS

FIG. 3 is an enlarged sectional view of an essential part under a state where the conventional flexible shaft is inserted in a pipe.

FIG. 4 is a structural explanatory view of a liner tube for use in the conventional flexible shaft.

FIG. 5 is a schematic composition view under servicing condition of the back type mowing machine using the conventional flexible shaft.

DETAILED DESCRIPTION OF THE PREFERRED EMBODIMENTS

Figure 1:
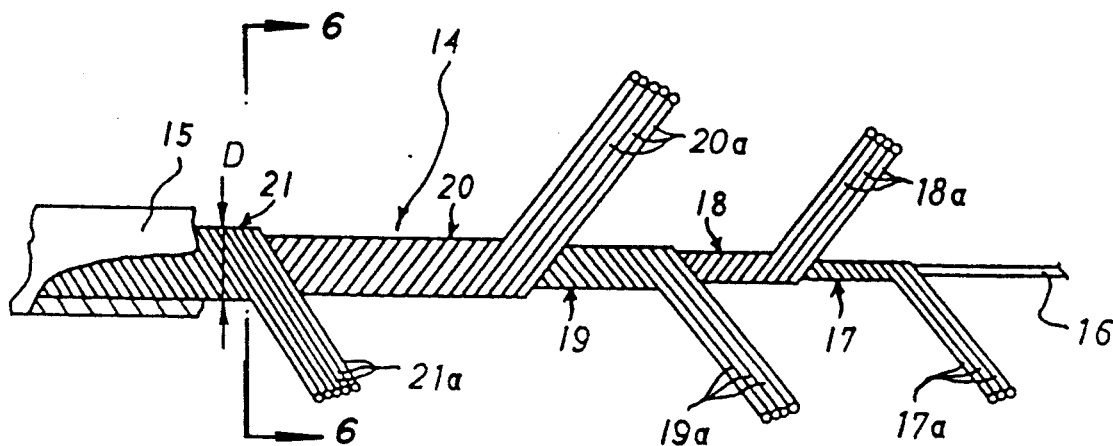
FIG. 1 is a structural explanatory view of a flexible shaft in an embodiment of this invention.
Figure 2:
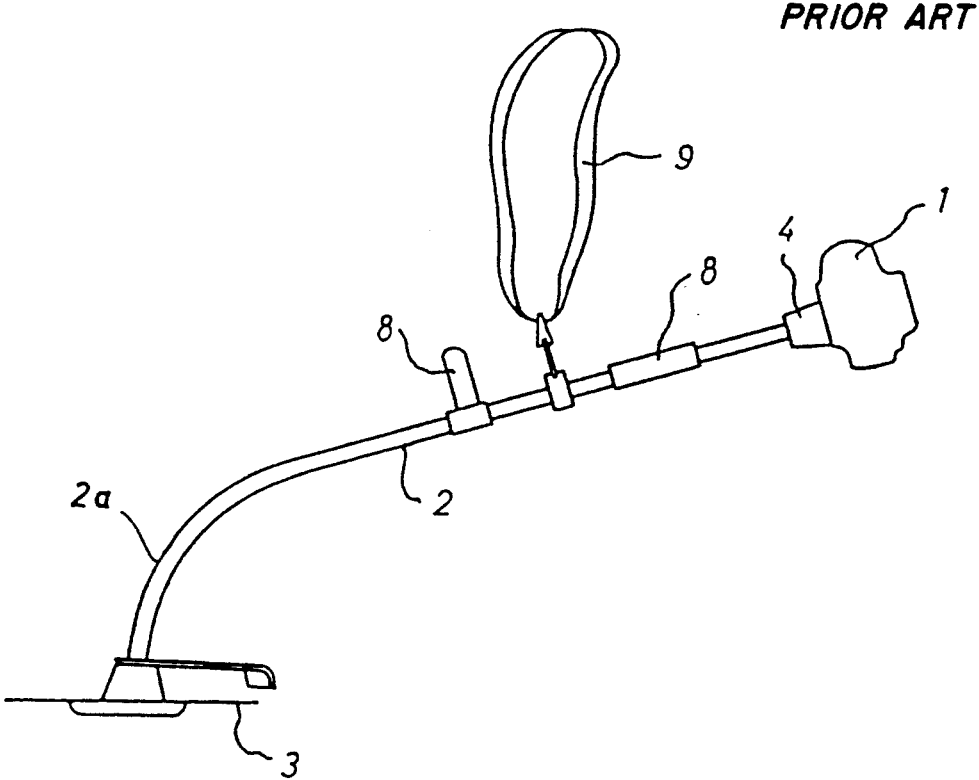
FIG. 2 is a schematic structural view of a shoulder type mowing machine using a conventional flexible shaft.
Figure 6:
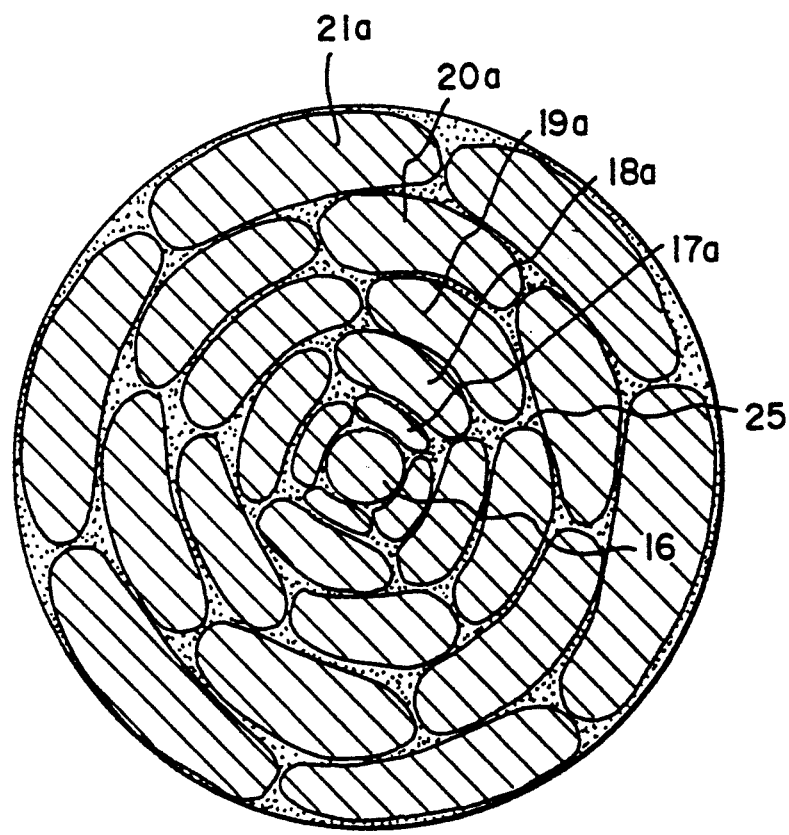
FIG. 6 is a cross-sectional view taken along line 6—6 in FIG. 1 of the flexible shaft of this invention.

A flexible shaft is composed of an inner shaft 14 and a liner tube 15 covering the inner shaft 14. The liner tube 15 has the same structure as the conventional liner tube 7. The inner shaft 14 is constructed such that a plurality of hemp yarns 17a closely adhered into a band shape are wound around an outer periphery of a steel core wire 16 having a circular section to form a grease-bearing layer. Element wire groups 18, 19, 20 and 21 which are formed by adhering a plurality of steel element wires 18a, 19a, 20a, and 21a into band shapes are wound around the grease-bearing layer 17 by turns in reverse directions so as to attain a specified outside diameter D. It is noted that a band shape is a group of adjoining wires arranged along a plane. In other words, the element wire group 19 is wound around an outer periphery of the the element wire group 18; the element wire group 20 is wound around an outer periphery of the the element wire group 19, the element wire group 21 is wound around an outer periphery of the the element wire group 20; and, the element wire groups 18, 19, 20 and 21 form four-fold layers having concentric sections. The grease-bearing layer 17 and the element wire groups 19 and 21 are wound in reverse directions relative to the windings of the element wire groups 18 and 20.

When the inner shaft 14 is manufactured, the core wire 16, the grease-bearing layer 17 and the element wire groups 18, 19, 20 and 21 are assembled into the above-mentioned structure and placed in a vacuum impregnation device. The product thus assembled is impregnated with lubricant (such as, grease or the like) which has been heated to a temperature of, e.g., 120° C., which is a little higher than a normal service temperature (85 to 100° C., for example) under atmospheric condition of vacuum, and is then released from the vacuum condition. The atmospheric pressure thus thrusts the lubricant, which has an increased flow property due to the raised temperature, forcedly in clearances between the element wires 18a, 19a, 20a, 21a, the hemp yarn 17a and the core wire 16, so that the lubricant is impregnated in inside clearances by means of so-called vacuum impregnation system. The lubricant penetrates into the hemp yarn 17a to form the grease-bearing layer 17. The inner shaft 14 thus impregnated with lubricant 25 is inserted in the liner tube 15 without filling the lubricant in the liner tube 15 and without applying the lubricant onto the outer periphery of the inner shaft 14. Incidentally, specific gravities of the element wires 18a, 19a, 20a and 21a made of steel wires are 7.8, while that of the inner shaft 14 which has not been impregnated with lubricant yet is 6.8 or smaller. Lubricant of 20 grams has conventionally been consumed for filling in the liner tube 7 and applying onto the outer periphery of the inner shaft 6, but a weight of the lubricant impregnated in the inner shaft 14 by the above-mentioned method is about a half or a third of the conventional weight.

The flexible shaft thus obtained was put in service at a service temperature of 85 to 100° C., and no seizure was found even after 100 operation hours.

Function of the Invention

Since the lubricant 25 (such as, grease or the like) is impregnated in clearances between the element wires 18a, 19a, 20a and 21a of the inner shaft as described above, the wear due to friction between the element wires 18a, 19a, 20a and 21a is reduced to a minimum extent by the impregnated lubricant, and the heat generation is also controlled when the flexible shaft transmits the torque under its bent condition. Further, the lubricant 25 impregnated in the hemp yarn 17a of the grease-bearing layer 17 is gradually oozed by the centrifugal force in between the element wires 18a, 19a, 20a and 21a of the element wire groups 18, 19, 20 and 21 which are located over the grease-bearing layer 17 so that the lubricant maintains its lubricating function slowly and for a long period of time. Moreover, since the element wires 18a, 19a, 20a and 21a are wound firmly under the closely adhered condition, a quantity of lubricant thrown away by the centrifugal force is small compared to the lubricant oozed in between the element wires 18a, 19a, 20a and 21a so that the lubricant 25 is held in the inner shaft 14 for a long period of time in order to perform the lubricating and cooling functions. More particularly, the lubricant is subjected to the vacuum impregnation at a temperature higher than the normal service temperature so that a large quantity of the lubricant can be impregnated due to its decrease in viscosity at the time of impregnation. However, the viscosity of the lubricant is high at the time of operation so that a quantity of lubricant which leaves the inner shaft 14 is small even when the centrifugal force is applied to the shaft.

The grease-bearing layer 17 is composed of the hemp yarn 17a in the above-mentioned embodiment, but a glass fiber rope or the like may be used in place of the hemp yarn 17a.

The grease-bearing layer 17 is installed between the core wire 16 and the innermost element wire group 18 in the above-mentioned embodiment. However, the grease-bearing layer 17 may be installed between the element wire groups 18 and 19, or between the element wire groups 19 and 20, or between the element wire groups 20 and 21. Further, it may be installed two or more places of the aboves.

In case where a transmission torque of the flexible shaft is to be increased, it is enough to increase quantities of the element wires 18a, 19a, 20a and 21a of the element wire groups 18, 19, 20 and 21.

It is noted that the flexible shaft of this invention can be used for purposes other than the mowing machine.

Effect of the Invention

According to the present invention as described above, since the lubricant 25 is impregnated in clearances between the element wires of inner shaft, the wear due to the friction between the element wires can be reduced to a minimum by the impregnated lubricant, and the heat generation can also be controlled when the flexible shaft transmits the torque under its bent condition. Accordingly, the durability of the flexible shaft can be improved, and manpower for replacing the lubricant can be saved.

While the invention has been particularly shown and described in reference to preferred embodiments thereof, it will be understood by those skilled in the art that changes in form and details may be made therein without departing from the spirit and scope of the invention.

What is claimed is:

1. A flexible shaft, comprising:

an inner shaft having a steel core wire and element wire groups which are formed by closely adhering a plurality of steel element wires into band shapes wound around the steel core wire by turns in reverse directions relative to each other and the plurality of element wire groups being formed in layers and in concentric sections; and vacuum-impregnated lubricant impregnated within clearances between the plurality of steel element wires, wherein said vacuum-impregnated lubricant substantially surrounds the periphery of said steel core wire and each of inner ones of said plurality of steel element wires, and said vacuum-impregnated lubricant substantially fills up spaces between said steel element wires, wherein the lubricant is impregnated at a temperature higher than a normal temperature of the flexible shaft when in use.

2. A flexible shaft as set forth in claim 1, further comprising at least one grease-containing layer located in one of: (1) between the core wire and the element wire group, and (2) between the element wire groups.

3. A flexible shaft as set forth in claim 2, further comprising a grease-containing layer formed by winding a plurality of hemp yarns around the core wire under a condition that the hemp yarns are closely adhesively formed into a band shape.

* * * * *